Figure 6:
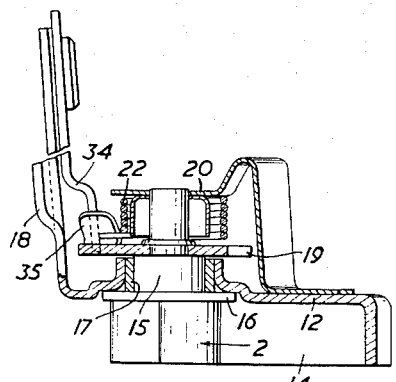

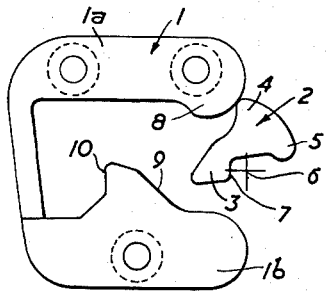
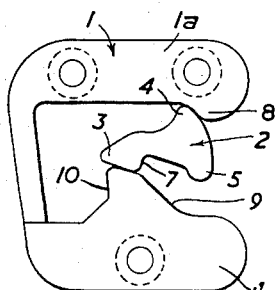
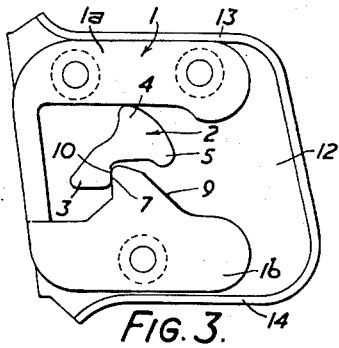
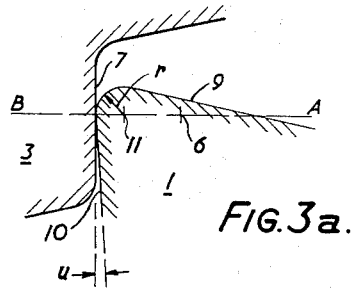
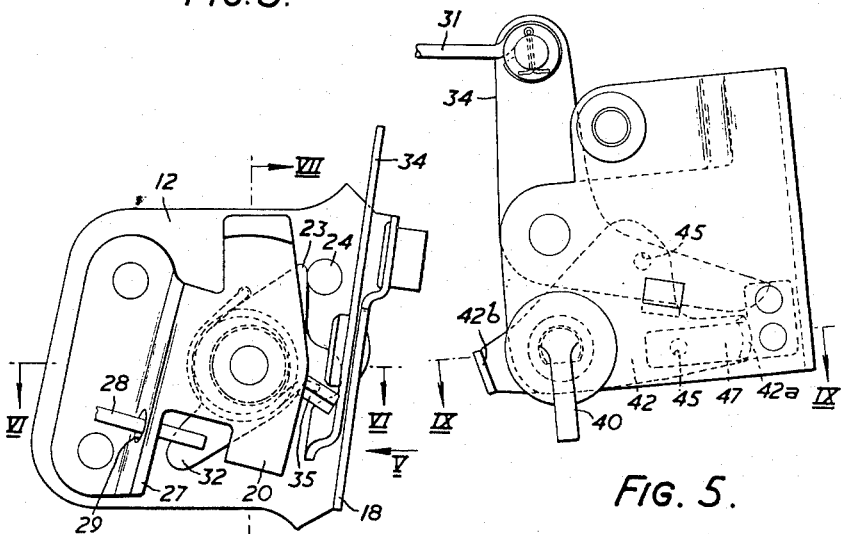

3,002,778
RELEASABLE FASTENING DEVICES
Victor Chanaryn, Solihull, and Kenneth Peter Pugh, Birmingham, England, assignors to Wilmot-Breeden Limited, Birmingham, England
Filed Oct. 19, 1959, Ser. No. 847,307
Claims priority, application Great Britain Oct. 22, 1958
20 Claims. (Cl. 292—221)

This invention relates to releasable fastening devices, more especially for doors, and is an improvement in or modification of the invention disclosed in our copending application Serial No. 666,131.

In the specifications of said application Serial No. 666,131 there is disclosed a releasable fastening device comprising two parts between which relative translatory movement and angular movement occurs during the fastening operation, said translatory movement occurring in a plane transverse to the axis of said angular movement and surface portions of said parts which coact during said relative movement having an evolution such that said angular movement is irreversible by relative translatory movement between the parts in the reverse direction when the parts have reached a relative coupling position in which they engage at a point substantially on said axis, due to the reaction force between the parts as a result of any tendency for such reverse relative translatory movement passing through said axis and hence generating a condition of substantially no-moment thereabout.

According to the present invention the reaction force between said surface portions when the parts are in the coupling position, in addition to being so directed that it produces substantially no torque about the axis of angular movement as a result of any tendency for reverse relative translatory movement, is substantially aligned with the direction of said relative translatory movement.

As a result of the present invention substantially the whole of the reaction force between the parts is available to oppose any tendency for relative translatory movement in the reverse direction, instead of merely a component of the reaction force as is the case when the latter is inclined to the direction of relative translatory movement. Thus the reaction force on said surface portions is kept at a minimum together with the resultant wear on these faces.

Preferably the coacting surface portions are flat and lie in planes substantially normal to said direction of relative translatory movement. As applied to a motor vehicle door fastening, in which as disclosed in the aforesaid specification of application No. 666,131 over-travel of the parts normally takes place against the peripheral door seals whose pressure then returns the parts to their coupling position, the provision of planar coacting portions in planes substantially normal to the direction of door travel enables a greater tolerance to be allowed in the manufacture of these portions, this tolerance being substantially taken up by the door seals.

One of the coacting edge portions is preferably slightly undercut, for example lying in a plane inclined to the plane normal to the direction of door movement at an angle of approximately 1½° so that in the normal coupling position of the parts a line contact is provided between them. This undercut enables slight misalignment of the parts when coupled to be tolerated before the limiting conditions of facial contact of the coacting edge portions is obtained.

Preferably one of the parts is angularly movable, being rotatably mounted about said axis of angular movement, whilst the other part is maintained fixed in the angular sense. Both of said parts may be of generally plate-like form, and the angularly movable part is preferably in the form of a multi-lobed cam rotatably mounted about an offset axis substantially normal to the plane of the cam whilst the other part may be in the form of a substantially G-shaped keeper.

The point of engagement of the cam and keeper, whilst lying substantially on the rotational axis of the cam, is preferably offset slightly therefrom in the direction of relative translatory movement of the cam during a fastening operation. This assists easy engagement and disengagement of the parts and also makes allowance for wear and manufacturing tolerances.

Upper and lower guide elements may be associated with the cam for translatory movement therewith, and specific restraint against upward and downward movement of the door relatively to the body may be provided by the wedging of the keeper between these elements. The wedging may be effected by a spring-loaded wedge which is mounted on one of the guide elements or the keeper and is accordingly engaged and displaced by the keeper or one of the guide elements during the fastening operation. Alternatively, vertical restraint may be achieved by wedging one limb of the keeper between a single guide element and a lobe of the cam which is disposed on the side of the latter remote from the coacting surface portion thereof, and with this arrangement the horizontal reaction force between the coacting surface portions of the cam and the keeper produces no reaction component therebetween at the point of wedging contact. The absence at the point of wedging contact of a reaction component of the horizontal reaction force reduces the risk, under adverse conditions, of a frictional couple being produced as the result of relative body and door movement during travel of the vehicle which would tend to rotate the cam in the uncoupling direction.

The cam is preferably spring loaded into its normal resting position which is defined by suitable stop means preventing further rotation of the cam in the coupling direction. Both cam and keeper may then be formed so that initial contact therebetween during the fastening operation will act to rotate the cam in the uncoupling direction into a position in which it can enter into the open mouth of the keeper, and the releasing means for the fastening also act to rotate the cam against its spring loading away from its coupling position so that it may readily be withdrawn from engagement with the keeper.

Figure 7:
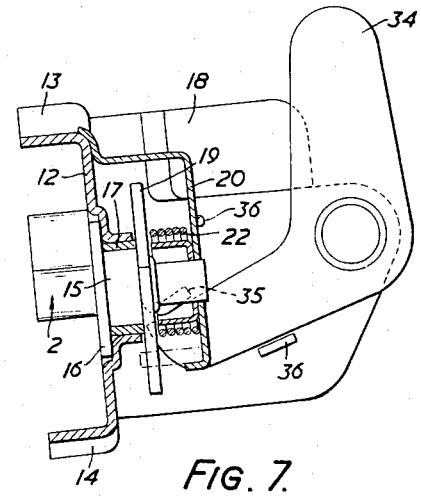
Figure 8:
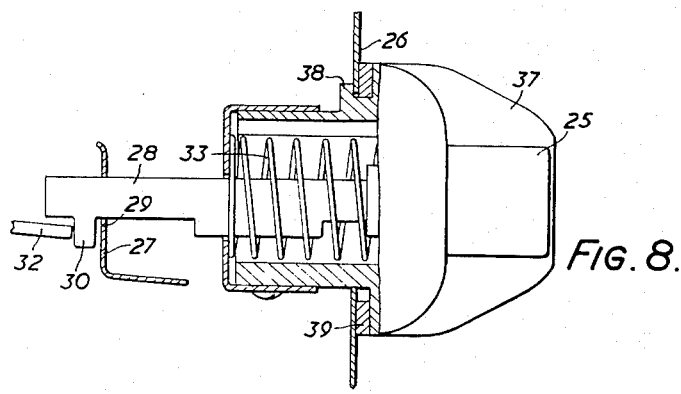
Figure 9:
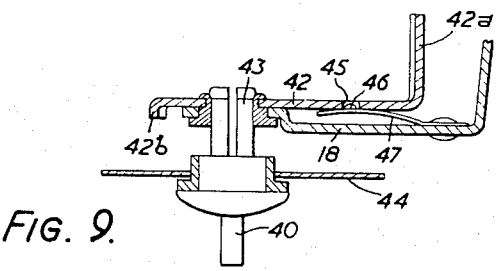

The invention will now be further described with reference to the accompanying drawings which illustrate, by way of example, one form of motor vehicle door fastening in accordance with the invention, and in which:

FIGURES 1 to 3 diagrammatically illustrate progressive stages by which an angularly movable part of the fastening engages with a stationary part during closing movement of the vehicle door, FIGURE 3a is a detail view on a larger scale of the parts of the fastening when engaged, FIGURE 4 is a rear view illustrating the internal elements of the fastening, FIGURE 5 is a side view in the direction of the arrow V in FIGURE 4, FIGURE 6 is a cross-sectional view on the line VI—VI in FIGURE 4, FIGURE 7 is a cross-sectional view on the line VII—VII in FIGURE 4, FIGURE 8 is a part cross-sectional view of an external operating pushbutton arrangement showing its operative relationship with the fastening, and FIGURE 9 is a cross-sectional view on the line IX—IX in FIGURE 5.

Referring to FIGURES 1 to 3a of the drawings, the fastening device diagrammatically illustrated therein comprises a stationary part in the form of a substantially G-shaped keeper 1 which is fixed to the body pillar of the vehicle and an angularly movable part or cam 2 carried by the door pillar. The cam is provided with three lobes 3, 4 and 5 and is angularly movable about a rotational axis 6, shown in FIGURE 1, which is fixed in relation to the door pillar. The lobe 3 provides a rounded leading end of the cam and is disposed forwardly of the rotational axis 6 whilst being somewhat downwardly inclined when the cam 2 is in its normal resting position.

The cam 2 is spring loaded in its positive coupling direction towards said normal resting position in which further angular movement of the cam in that direction is prevented by stop means which are hereinafter described. The lobe 3 of the cam merges smoothly into a substantially flat surface portion 7 which is disposed slightly in front of the rotational axis 6 of the cam and, when the latter is in said normal resting position, lies in a vertical plane normal to the direction of relative translatory movement of the cam 2 and the keeper 1 during the fastening operation. The tail portion of the cam comprises the opposed lobes 4 and 5, both of which are disposed above the rotational axis 6 when the cam 2 is in said normal resting position.

The keeper 1 is mounted on the body pillar so that the G-shape is in an upright position, and the upper jaw 1a of the keeper has an inward bulge 8 at its free end. The inwardly facing tail of the G-shape has an inclined outwardly facing surface portion 9 and a flat inwardly facing surface portion 10 which is slightly undercut with respect to said normal plane.

In fact, the surface portion 10 lies in a plane inclined at an angle of approximately 1½° to said normal plane and, when the cam 2 and keeper 1 are fully engaged (as shown in FIGURES 3 and 3a) and the cam 2 has turned to its coupling position relatively to the keeper 1, the undercut surface portion 10 and the substantially vertical surface portion 7 are in substantially line contact at the level of the rotational axis 6 of the cam. Thus the reaction force between the coacting surfaces 7 and 10, as a result of any tendency to separate the cam 2 and keeper 1 in the horizontal direction, passes substantially through the rotational axis 6 of the cam 2 and produces no torque on the latter tending to turn it in the reverse or uncoupling direction.

When the parts are coupled, as shown particularly in FIGURE 3a, a radiused upper section of the surface portion 10 which merges smoothly with the surface portion 9 engages the cam surface portion 7 on the line A—B along which the axis 6 moves during closing movement of the door. In this figure the angle of undercut U of the surface portion 10 relatively to the plane containing the surface portion 7 has been exaggerated for the sake of clarity. Ideally the keeper 1 would have a sharp edge which engages the surface portion 7 at the axis 6, but as the necessary knife edge would be subjected to excessive wear and extremely difficult to form and harden with the required accuracy the surface portion 10 is provided with the aforesaid radiused upper section.

The radiused upper section has a radius r and is centred about an axis 11 lying on the line A—B (see FIGURE 3a), and to allow the cam 2 to turn into its coupling position around the radiused section it is essential that the surface portion 7 be offset from its rotational axis by an amount at least equal to the radius r. For ease of engagement and disengagement of the cam 2 it is desirable that the offset should be somewhat greater than the radius r and to allow for the necessary manufacturing tolerances, mainly vertical tolerances, it is necessary to allow a further clearance for the cam 2 as its turns around the radiused section of the keeper tail, and hence the surface portion 7 is still further offset from the axis 6 as shown in FIGURE 3a. However, this figure is shown to a greatly enlarged scale and in practice the offset of the surface portion 7 about the axis 6 is kept as small as manufacturing problems will allow so that when coupled the cam 2 and keeper 1 engage at a point substantially on the axis 6.

As the cam 2 and keeper 1 approach during a fastening operation initial contact occurs between the upper tail lobe 4 of the cam and the inward bulge 8 of the keeper 1 as shown in FIGURE 1, and this contact produces a torque which rotates the cam 2 against its spring loading so that the leading lobe 3 of the cam is aligned for entry into the open mouth of the keeper 1. Further relative translatory movement of the cam 2 and keeper 1 moves the tail lobe 4 underneath the inward bulge 8 whereupon the spring loading turns the cam 2 in the coupling direction, with the result that the leading lobe 3 of the cam engages the inclined outwardly facing surface 9 of the tail of the keeper and the upper tail lobe 4 rises so that it is trapped within the inward bulge 8 of the keeper, as shown in FIGURE 2. This positioning of the cam 2 and keeper 1 provides a condition of "safety lock" which can occur when the door is slammed with insufficient force to effect complete engagement of the parts but with sufficient force to cause the upper tail lobe 4 of the cam to pass below the lower edge of the inward bulge 8.

In the safety lock position the cam 2 resists any tendency to reopening of the door by engagement of the upper tail lobe 4 with the inner portion of the inward bulge 8 whilst the leading lobe 3 rests on the tail of the G-shape at a point forwardly of its rotational axis 6.

On further inward movement of the cam 2, the leading lobe 3 rides over the tail of the G-shape until the cam 2 is free to turn under the action of its spring loading into its coupling or fully locked position shown in FIGURE 3. In this position, as already explained, the reaction force resulting from the coaction of the cam 2 and the keeper 1, as a result of any tendency for opening of the door, passes substantially through the rotational axis 6 of the cam 2 and produces no torque on the latter tending to produce uncoupling of the cam 2 and keeper 1.

The lower tail lobe 5 of the cam 2 is so formed that in the event of spring failure, or of such rapid closing of the door that the spring is substantially overridden, this lobe will contact the outwardly facing inclined face 9 to produce a torque on the cam 2 in the coupling direction which will act to urge the cam 2 into its coupling position.

The external surfaces of the upper and lower jaws 1a and 1b of the keeper are adapted to engage with a guide carried by the door pillar in fixed relationship to the rotational axis 6 of the cam. This guide takes the form of a channel-like guide plate 12, shown in its full engagement with the keeper 1 in FIGURE 3 but omitted from FIGURES 1 and 2, the sides of which form guide elements 13 and 14 and which is outwardly flared or funnel shaped at its forward end to ensure that the open end of the keeper 1 is correctly guided thereinto during the door closing operation, and thereby also ensuring that the cam 2 is correctly engaged with the keeper 1. The guide plate 12 also forms a backplate of the fastening, and a spindle 15 carrying the cam 2 is rotatably mounted in the backplate 12 with its longitudinal axis normal to the plane of the backplate.

When the cam 2 is in its coupling position within the keeper 1, the upper tail lobe 4 is pressed firmly against the inner surface of the upper jaw 1a of the keeper, as a result of which this jaw 1a is held tightly in a vertical sense by this contact and the opposite contact between its external surface and the upper flange 13 of the backplate 12 to provide effective vertical restraint for the fastening. The point of contact of the upper tail lobe 4 with the upper jaw 1a of the keeper is so disposed with respect to the rotational axis 6 that when the fastening device is in its coupling position any reaction at the point of contact passes substantially through the rotational axis 6. Thus this reaction produces substantially no torque on the cam 2 tending to turn it in the uncoupling direction.

The cam is formed integrally with a large diameter base or boss 16, see FIGURES 6 and 7, and the cam spindle 15 is disposed coaxially with respect to this base 16. A bearing 17 in which the cam spindle 15 is rotatably mounted is secured in the backplate 12 and the cam 2 is disposed on the outer side of the backplate with the spindle 15 projecting inwardly therethrough. A portion 18 of the backplate 12 is bent at right angles to the remainder of the backplate along the forward edge of the latter and projects into the structure of the door.

A cam plate 19 is fixed on the cam spindle 15 on the inner side of the bearing 17 and serves to limit axial movement of the spindle 15, and the inner end of the latter is supported in an outrigger bearing plate 20 which is mounted on the inner face of the backplate 12. The cam 2 is spring loaded towards its coupling position by a helical torsion spring 22 which is anchored at one end to the plate 19 and at the other end to the bearing plate 20. Movement of the cam 2 under the influence of the spring 22 is limited by abutment of an arm 23 of the cam plate 19 and a stop 24 mounted on the inner face of the backplate 12, and such abutment defines the normal resting position of the cam 2.

Angular movement of the plate 19 to turn the cam 2 in its uncoupling direction against the action of the torsion spring 22 may be effected either from outside the door by a pushbutton 25 mounted on the door structure, and outer door panel being shown at 26 in FIGURE 8, or from inside the door through a remote control linkage 31.

An integral supporting flange 27 of the bearing plate 20, which in part supports the plate 20 on the backplate 12, is disposed on the rearward side of the spindle 15 and lies in a plane substantially normal to the longitudinal axis of the pushbutton stem 28. The stem 28 passes through and is laterally supported in an aperture 29 in the supporting flange 27, see FIGURES 4 and 8, and has a projecting shoulder 30 formed thereon which is normally disposed to contact a further projecting arm 32 of the plate 20 so that inward movement of the pushbutton 25 against its return spring 33 angularly displaces the cam plate 19 and cam 2 in the uncoupling direction.

The pushbutton 25 contains a key-operated locking device (not illustrated) which acts to turn the pushbutton stem 28 to a locked position in which the path of movement of the projecting shoulder 30 clears the arm 31, so that actuation of the pushbutton 25 does not rotate the cam 2.

Remote control of the fastening device to release the lock is provided by a remote control lever 34 pivotally mounted on the inwardly bent portion 18 of the backplate 12. One arm of the remote control lever is formed for attachment to the remote control linkage 31 and the other arm is disposed for engagement with a third projecting arm 35 of the cam plate 19, whereby an actuation of the remote control linkage 31 the cam 2 is angularly displaced in the uncoupling direction. Stops 36 are disposed on the backplate portion 18 which limit the angular movement of the remote control lever 34.

The pushbutton 25 is slidably mounted in an external handle structure 37 which projects through an aperture in the panel 26. Three equiangularly spaced tongues such as 38 project from the structure 37 and engage behind the panel 26 to retain the structure in position against the resilience of a resilient sealing ring 39.

In the embodiment described the rotary wedging contact of the upper tail lobe 4 of the cam 2 and the keeper 1 defines the coupling position of the cam. When vertical restraint is provided in other ways, for example by means of a spring-loaded wedge mounted on a guide element or the keeper itself, the normal resting position of the cam 2 will represent its coupling position and limitation of the rotation of the cam in the coupling direction under the influence of the torsion spring 22, when the parts are in their coupling position, is provided by the stop 24 mounted on the backplate 12.

In addition to the external key-operated locking means located in the pushbutton 25, internally operated locking means actuated by a handle 40 are provided, as shown in FIGURES 5 and 9. These locking means, which are omitted from the remaining figures, comprise a locking or blocking lever 42 separately pivoted on the backplate portion 18 about the axis of a spindle 43 to which it is rotatably coupled and on which the handle 40 is mounted. The handle 40 is positioned on the inner side of an inner door panel 44 through an aperture in which the boss of the handle and the spindle 43 project.

At one end the lever 42 has an inwardly projecting portion 42a which in the operative position of the lever 42, as illustrated in FIGURES 5 and 9, is positioned in front of the inner end of the pushbutton stem 28 to prevent operative inward movement of the latter so that the fastening cannot be released from outside the door; however, with the door so locked the remote control linkage 31 is still operative.

At its other end the lever 42 has a small outwardly turned portion 42b which limits angular movement of the lever to its other or inoperative position in which movement of the pushbutton stem 28 is not obstructed, and the lever 42 is retained in either of its positions by spring indexing means comprising two detent bores 45 one or other of which is engaged by a rounded projection 46 mounted on a detent leaf spring 47 riveted to the backplate portion 18. The lever 42 is turned between its indexed positions from inside the door by means of the handle 40.

In an alternative arrangement of internally operated locking means, which is not illustrated, the pushbutton stem 28 instead of acting directly on the cam plate 19, acts to rotate a pushbutton lever which in turn rotates the cam 2 in the uncoupling direction. The internally operated locking means with this arrangement comprises an arm of the remote control lever 34 which, on movement of the remote control linkage 31 in the opposite direction to that which releases the fastening, is displaced into a position in which it is so disposed that it blocks and thus prevents an operative releasing movement of the pushbutton lever.

As an additional safety feature, a locking device which is also not illustrated can be incorporated which acts to prevent operation of the remote control linkage 31 to release the fastening device. This prevents inadvertent release when the vehicle is travelling, for example by child passengers, and is conveniently controlled by movement of a safety lever projecting through the backplate 12 and inaccessible when the door is closed. The safety lever preferably acts to block releasing movement of the remote control lever 34, and it may have a hook-like arm which engages with a pin carried by an arm of the remote control lever 34 to prevent releasing movement of the latter.

The keeper illustrated diagrammatically in FIGURES 1 to 3 is of composite construction, being mainly formed of plastic material whilst the entire lower jaw 1b is formed of metal. The upper jaw 1a and the rear limb are formed as a unitary moulding with a backplate of the keeper 1, the metal lower jaw 1b being riveted to this backplate. In an alternative construction which is not illustrated the keeper is of integral construction, being manufactured from nylon or other suitable plastic material, and the contact surfaces of the tail of the lower jaw 1b are then preferably covered with a lining of spring steel in order to prevent undue wear.

The described embodiment of the invention is illustrated in the accompanying drawings.

We claim:

1. A releasable fastening device comprising a generally plate-like cam rotatably mounted about an axis, a generally plate-like keeper adapted for coupling engagement with said cam, said cam and keeper being adapted for relative translatory movement during a fastening operation as a result of which movement the cam turns to a relative coupling position, and manually operable releasing means which act to turn the cam in the releasing direction away from said relative coupling position to release the fastening, said cam and keeper when coupled contacting each other substantially on said axis and so that the reaction force between them, as a result of any tendency for relative translatory movement in the reverse direction, is substantially aligned with the direction of said translatory movement and exerts substantially no releasing torque on the cam about said axis.

2. A releasable fastening device for a motor vehicle door, comprising two parts which during a fastening operation undergo relative translatory movement as a result of which relative angular movement of said parts to a relative coupling position occurs, said parts having coacting surface portions which when in said coupling position engage substantially at the axis of said angular movement and so that the reaction force, as a result of any tendency for reverse translatory movement, is substantially aligned with the direction of said translatory movement and exerts substantially no moment tending to produce relative angular movement of said parts away from said coupling position.

3. A releasable fastening device according to claim 2, wherein said coacting surface portions are flat and lie in planes substantially normal to said direction of relative translatory movement.

4. A releasable fastening device according to claim 3, wherein one of the coacting surface portions is slightly undercut so that in the normal coupling position of the parts a line contact is provided between them.

5. A releasable fastening device according to claim 4, wherein said undercut surface portion lies in a plane inclined to said normal plane at an angle of the order of 1½°.

6. A releasable door fastening device, comprising a rotatably mounted part, a keeper adapted for coupling engagement with said rotatable part as a result of relative translatory movement of said parts which produces angular movement of the rotatable part to a coupling position, said parts having coacting surface portions which when said parts are coupled engage at a position slightly offset from the rotational axis of said rotatable part in the direction of relative translatory movement of that part during a fastening operation, the engagement being such that the reaction force between the parts as a result of any tendency for reverse relative translatory movement is substantially aligned with the direction of translatory movement and exerts substantially no turning moment on the rotatable part.

7. A releasable fastening device comprising a rotatably mounted cam, a keeper adapted to remain fixed at least in the angular sense during a fastening operation, spring means urging said cam into a normal resting angular position which is also the angular position it adopts when coupled to said keeper as a result of relative translatory movement of said cam and keeper, stop means defining said resting position of said cam, and releasing means which act to turn said cam against said spring means away from said resting position for withdrawal from engagement with said keeper, said cam and keeper being formed with surface portions which when coupled engage substantially at the axis about which said cam is rotatably mounted in a manner such that any tendency for reverse relative translatory movement produces a reaction force therebetween which is substantially aligned with the direction of said translatory movement and exerts substantially no turning moment on said cam.

8. A releasable fastening device according to claim 7, wherein said cam and keeper are formed so that initial contact therebetween during the fastening operation acts to turn the cam away from said resting position in the uncoupling direction into a position in which it can enter into engagement with the keeper.

9. A releasable fastening device according to claim 8, wherein said keeper is G shaped and said cam has a tail lobe which initially engages one limb of the keeper to turn the cam in the uncoupling direction.

10. A releasable fastening device according to claim 9, wherein said limb of the keeper has an inward bulge with which the tail lobe can engage to provide a condition of "safety lock" which can occur if the device is incompletely fastened.

11. A releasable fastening device according to claim 10, wherein the cam has a further tail lobe which, during over-travel of the parts, engages the other limb of said keeper to turn the cam in the coupling direction to its coupling position.

12. A releasable fastening device according to claim 7, wherein the cam is multi-lobed and offset from said axis.

13. A releasable fastening device according to claim 12, wherein the cam has a leading lobe on which the corresponding surface portion is formed.

14. A releasable fastening device according to claim 13, wherein said keeper is substantially G-shaped with a tail portion which is formed with the corresponding surface portion.

15. A releasable fastening device according to claim 14, wherein the keeper is of composite construction and formed mainly of plastic material apart from the entire jaw providing said tail portion which is formed of metal.

16. A releasable fastening device according to claim 15, wherein substantially the entire keeper is formed of plastic material but the contact surfaces of the tail portion are covered with a lining of spring steel.

17. A releasable fastening device according to claim 7, wherein said releasing means comprise a pushbutton with a stem which, during an operative movement of the pushbutton, engages a member fixed to said cam to turn the latter in the uncoupling direction.

18. A releasable door fastening device comprising upper and lower guide elements, a multi-lobed cam rotatably mounted between said elements about an axis fixed relatively to the latter, a keeper adapted to remain angularly fixed during a fastening operation in which said cam and keeper undergo relative translatory movement which causes relative angular movement of said cam to a relative coupling position, said guide elements being arranged to guide said keeper during said relative translatory movement into coupling engagement with said cam, and releasing means adapted to turn said cam away from said coupling position to release the fastening, said cam and keeper being so formed that when coupled they engage at a position substantially at said axis and so that any reaction force between them produces substantially no turning moment on said cam and is substantially aligned with the direction of said relative translatory movement.

19. A releasable fastening device according to claim 18, wherein restraint in a direction laterally of said direction of relative translatory movement is provided, when the device is fastened, by wedging of the keeper between said elements.

20. A releasable fastening device according to claim 19, wherein said restraint is achieved by wedging one limb of the keeper between one of said guide elements and a tail lobe of the cam which is disposed on the side of the latter remote from the region of coupling engagement with said keeper.

References Cited in the file of this patent

UNITED STATES PATENTS

| | | |
|---|---|---|
| 2,218,183 | Springer | Oct. 15, 1940 |
| 2,246,786 | Dall | June 24, 1941 |
| 2,499,165 | Roethel | Feb. 28, 1950 |
| 2,674,483 | De Vito | Apr. 6, 1954 |
| 2,683,050 | Allen | July 6, 1954 |
| 2,814,193 | Roethel | Nov. 26, 1957 |
| 2,863,688 | Endter | Dec. 9, 1958 |

FOREIGN PATENTS

| | | |
|---|---|---|
| 740,577 | Germany | Oct. 23, 1943 |